United States Patent [19]

Miller

[11] Patent Number: 4,682,276

[45] Date of Patent: Jul. 21, 1987

[54] LOW VOLTAGE LIGHTING FIXTURE WITH INTEGRAL THERMALLY CONTROLLED COAXIAL TRANSFORMER

[76] Inventor: Jack V. Miller, 700 N. Auburn Ave., Sierra Madre, Calif. 91024

[21] Appl. No.: 854,561

[22] Filed: Apr. 22, 1986

[51] Int. Cl.$^4$ .......................... F21V 29/00; F21V 7/00
[52] U.S. Cl. ...................................... 362/294; 362/296; 362/265; 362/263
[58] Field of Search ............... 362/290, 296, 265, 263, 362/291, 292, 217, 218, 362, 313, 806, 264

[56] References Cited

U.S. PATENT DOCUMENTS

| | | | |
|---|---|---|---|
| 924,975 | 6/1909 | Ferguson | 362/265 |
| 1,091,715 | 3/1914 | Steinmetz | 362/265 |
| 1,092,083 | 3/1914 | Steinmetz | 362/265 |
| 1,866,750 | 7/1932 | Brownell | 362/296 |
| 1,938,555 | 12/1933 | Cadiceux | 362/265 |
| 3,949,211 | 4/1976 | Elms | 362/265 |
| 4,091,369 | 5/1978 | Edelbick | 362/294 |
| 4,403,277 | 9/1983 | Eargle, Jr. et al. | 362/263 |
| 4,414,615 | 11/1983 | Szeker et al. | 362/263 |
| 4,455,595 | 6/1984 | Engel et al. | 362/263 |
| 4,595,971 | 6/1986 | Dean | 362/294 |

Primary Examiner—Raymond A. Nelli

[57] ABSTRACT

A low voltage lighting fixture has a lamp housing having distal and proximal ends and is made of heat conducting material. A low voltage lamp is supported in an integral socket on a central axis in the distal end of the externally finned housing. A generally planar thermal barrier made of poor heat conducting material is provided at the proximal end of the lamp housing, and a tubular transformer housing, including a low voltage transformer means, is coaxially attached to the proximal end of the lamp housing in abutment with the thermal barrier. In a preferred embodiment convective cooling air passages are provided between the lamp housing and the thermal barrier, and additional convective cooling passages are provided between the thermal barrier and the transformer housing, whereby lamp heat is dissipated by the cooling fins with limited thermal conduction to the transformer. In an alternate preferred embodiment a male screw base is provided on the distal end of the transformer housing, whereby the fixture may be directly screwed into a conventional lamp socket.

10 Claims, 5 Drawing Figures

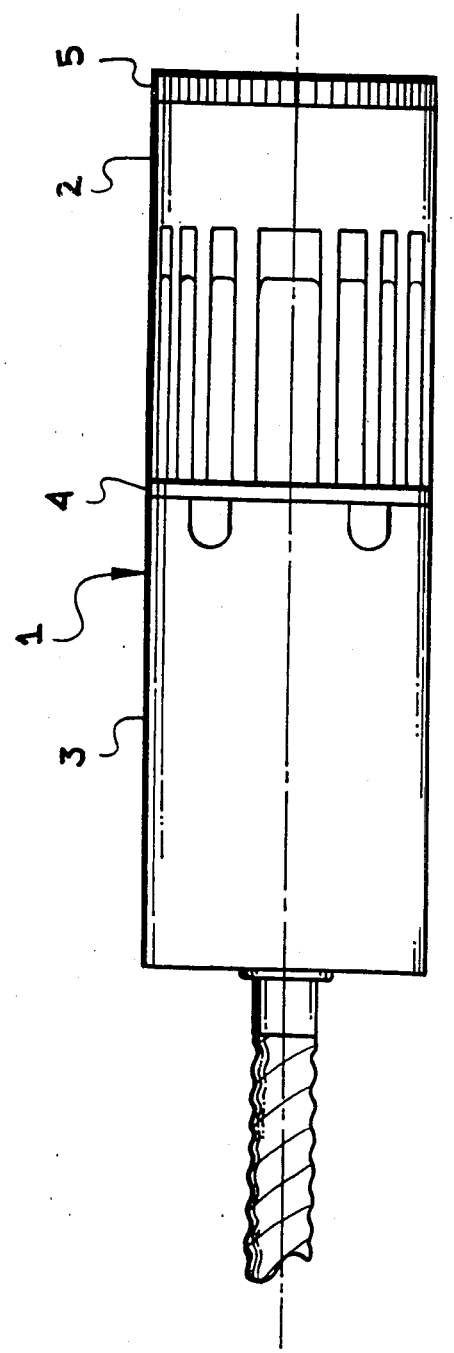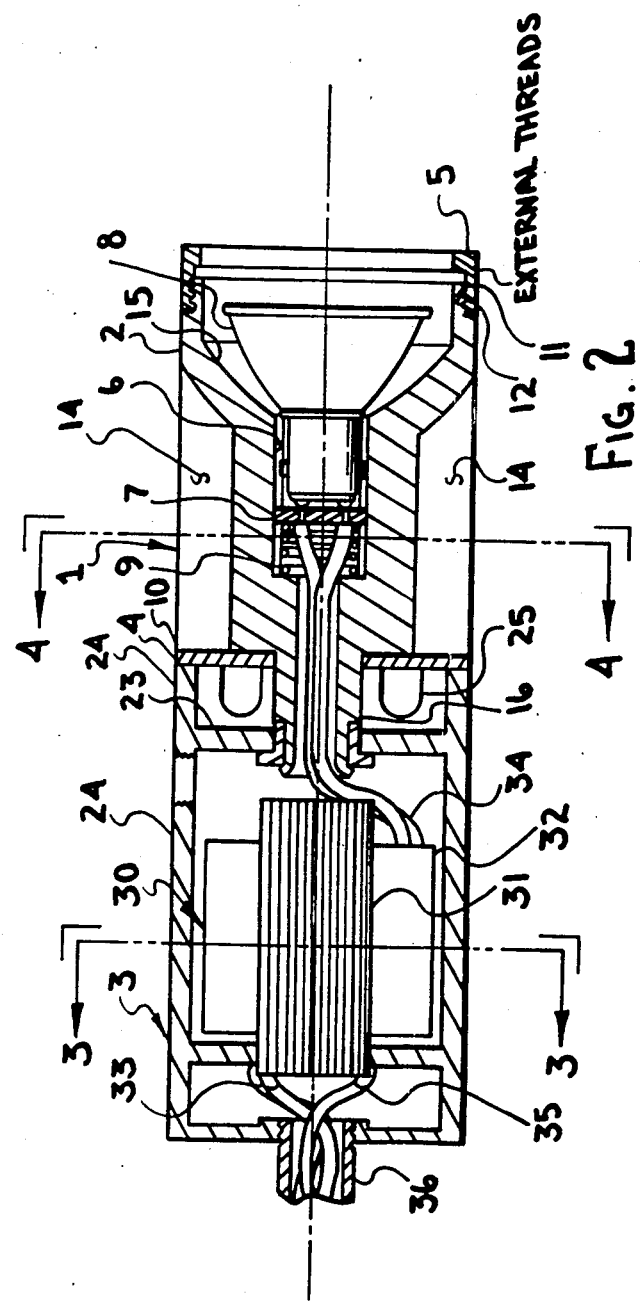

LOW VOLTAGE LIGHTING FIXTURE WITH INTEGRAL THERMALLY CONTROLLED COAXIAL TRANSFORMER

BACKGROUND OF THE INVENTION

Low voltage lighting fixtures which take advantage of the higher efficiencies and improved color temperatures of halogen filled incandescent lamps are in wide use. Due to the high current levels required for a given lamp wattage at low voltage, it is desireable to provide transformation of the high line voltage to low lamp voltage as close to the lamp as possible. Most presently used fixtures provide a transformer in an enclosure that is adjacent to but separate from the lamp housing to keep the lamp heat away from the transformer.

There are a few fixtures in use that presently include a low voltage transformer in the fixture housing, but in order to keep the transformer within thermal operating limits the housing then must be almost entirely comprised of ventilation holes in the form of louvers or perforated sheet metal contruction. This permits the intrusion of dirt, dust and moisture directly into the fixture along with the convection air, and usually results in an ugly external appearance in which light leaks from every cooling aperture. This phenomenon is accentuated by the use of halogen lamps having glass dichroic reflectors, in which a portion of the light in the visible spectrum and most of the infrared is passed through the lamp reflector and into the fixture housing.

SUMMARY OF THE INVENTION

A primary purpose of the present invention is to provide a low voltage lighting fixture having an integral transformer that is unaffected by the lamp heat. It is a further purpose of the present invention to provide a low voltage lighting fixture having an integral transformer which does not convect cooling air past electrical components in the interior of the fixture.

A preferred embodiment includes a lamp housing having distal and proximal ends and made of heat conducting material, having an electrically connecting lamp socket on a central axis and a low voltage lamp supported in the distal end of the housing with its base in intimate thermal contact with the lamp housing. Cooling fins integral with the lamp housing are disposed about the exterior of the lamp socket. A thermal barrier is provided at the proximal end of the lamp housing to thermally separate the lamp housing from a transformer housing attached to the proximal end of the lamp housing. A transformer within the transformer housing has high voltage input electrical conducting means connectable to a source of external alternating current power and low voltage output electrical conducting means passing through the thermal barrier and connected to the lamp socket of the lamp housing.

Another preferred embodiment provides a male screw base on the proximal end of the transformer housing, whereby the lighting fixture may be directly screwed into a line voltage socket to replace a conventional incandescent light bulb.

BRIEF DESCRIPTION OF THE DRAWINGS

FIG. 1 shows an exterior side elevation view of a low voltage fixture according to the invention;

FIG. 2 is a cross-sectional view taken along the axial centerline of FIG. 1;

DETAILED DESCRIPTION OF THE DRAWINGS

Figure 3:
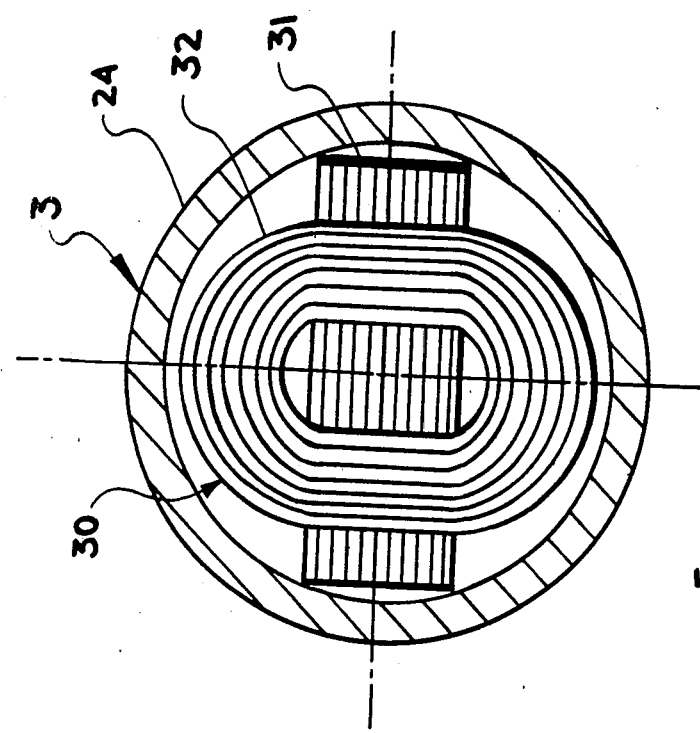
FIG. 3 is a cross-sectional view taken along section line 3—3 of FIG. 1.

In FIG. 1 fixture 1 is shown having a lamp housing 2 thermally isolated from a transformer housing 3 by a thermal barrier 4 and having a retaining trim ring 5.

In FIG. 2 fixture 1 is shown having a lamp housing 2 providing an integral lamp socket 6 with lamp connection means 7 urged into electrical contact with a bayonet base lamp 8 by a spring 9. Housing 2 has a proximal end 10 and a distal end 11, the proximal end 11 being provided with screw threads 12 engaging the retaining trim ring 5. The lamp socket 6 is integral with a plurality of heat radiating ribs 14, terminates at its distal end in an integral concave reflector surface 14, and terminates at its proximal end in an integral tubular rivet 16. The proximal end 10 of lamp housing 2 is in contact with a thermal barrier 20 at the tips of ribs 14, providing a small contact area for heat transfer.

Thermal barrier 20 is made of a low heat transmission material, such as molded plastic or bonded fiber sheet. A tubular transformer housing 3 has an end closure 23 across generally tubular walls 24. Transformer housing 3 is secured to the lamp housing 2 by spinning over the tubular rivet portion 25 of lamp housing 3, capturing a thermal bushing 26 made of thermal insulating material similar to that of the thermal barrier 4. A number of ventilation holes 25 are provided in the distal end of tubular wall 24 of transformer housing 3, to provide convective cooling for the tubular rivet portion 25 of lamp housing 2, and to minimize heat transfer from lamp 8 to transformer housing 3.

A low voltage transformer means 30 is shown as a step-down magnetic transformer having a laminated core 31, a wound core 32, high voltage input conductors 33, low voltage output conductors 34 and a grounding connection 35. This is a representative arrangement for low voltage conversion that may be implemented by any number of alternate electronic means in common use. An attachment means 36 is shown in the form of a threaded nipple, but also may take on any of many configurations including flexible conduits, pendants, swag connectors and swivels.

In FIG. 3 the transformer housing may be seen in cross section, with transformer 30 having the core 31 in intimate thermal contact with housing wall 24, and having the coil 32 supported therein.

Figure 4:
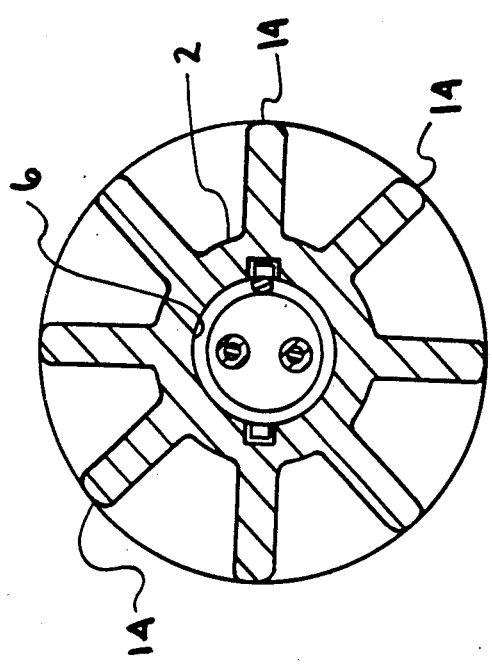
FIG. 4 is a cross-sectional view taken along section line 4—4 of FIG. 1.

In FIG. 4 the cross section of the lamp housing 2 is shown having an integral lamp socket 6 and the integral cooling fins 14, whereby lamp heat is dissipated through the fins 14.

Figure 5:
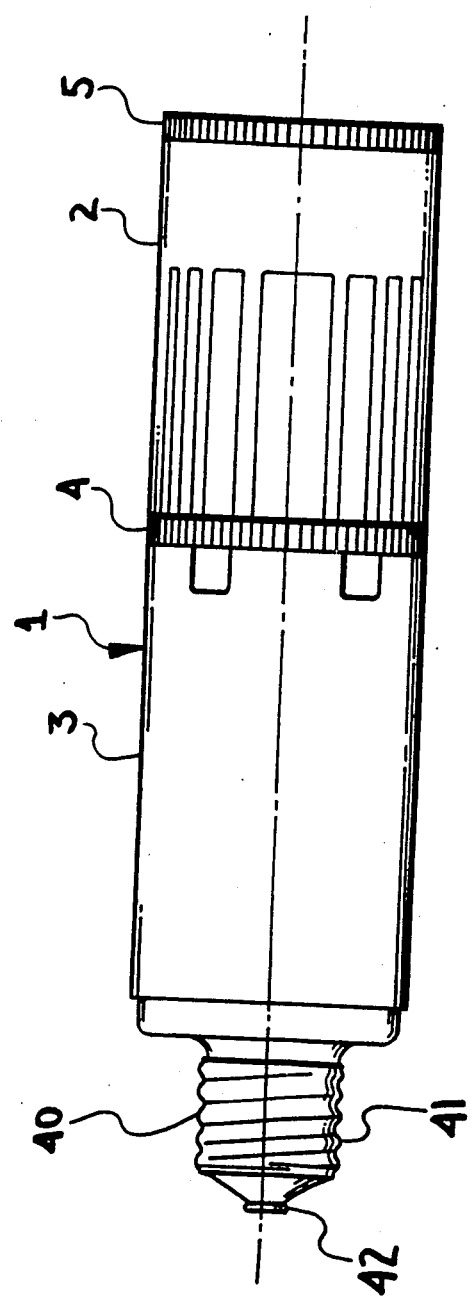
FIG. 5 is an exterior side elevation view of a low voltage fixture having a male screw base.

In FIG. 5 lighting fixture 1 is shown having the transformer housing 3 terminating at the proximal end in a male lamp screw base 40 having the high voltage transformer conductors connected to a screw shell 41 and a center contact 42, whereby the fixture can replace an ordinary incandescent light bulb in virtually any electrical socket.

The combination of an integral lamp socket with a lamp housing having integral cooling fins, thermal barriers between the lamp housing and the transformer housing, and convective intercooling between the lamp housing and transformer housing while providing intimate thermal contact between the transformer and the transformer housing has resulted in a very practical fixture that is capable of extended operation within the safe operating limits of the low voltage transformer within the fixture housing. The resulting fixture is attractive, has no light leaks, and does not permit convective cooling air to deposit dirt or moisture on electrical parts within the fixture.

I claim:.

1. A low voltage lighting fixture comprising:
   a lamp housing having distal and proximal ends and made of heat conducting material, having an electrically connecting lamp socket on a central axis, a low voltage lamp supported substantially within the distal end of the housing by the lamp socket and a plurality of cooling fins disposed about the exterior of the lamp socket;
   a generally planar thermal barrier made of a heat insulating material, disposed at the proximal end of the lamp housing and in thermal contact with a portion of the area of the lamp housing cooling fins;
   a tubular transformer housing coaxially disposed at the proximal end of the lamp housing, attached thereto in abuttment with the thermal barrier and in thermal contact with a portion of the area of the thermal barrier; and
   a transformer means disposed within the transformer housing, having high voltage input electrical conducting means connectable to a source of external alternating current power and low voltage output electrical conducting means passing through the thermal barrier and connected to the lamp socket of the lamp housing.

2. A low voltage lighting fixture according to claim 1 in which the distal end of the lamp housing is provided with a coaxially disposed concave reflector surface.

3. A low voltage lighting fixture according to claim 1 or 2 in which the cooling fins of the lamp housing are axially oriented and terminate at the proximal end of the lamp housing, and the 4. A low voltage lighting fixture according to claim 1 or 2 in which a means for the passage of convection air is provided between the proximal ends of the lamp housing cooling fins and the thermal barrier.

5. A low voltage lighting fixture according to claim 1 or 2, in which a means for passage of convection air is provided between the thermal barrier and the transformer housing.

6. A low voltage lighting fixture according to claim 1 in which the high voltage input electrical conducting means is connected to a coaxial and proximally mounted electrical screw base connector.

7. A low voltage lighting fixture according to claim 1 in which the distal end of the lamp housing is provided with an external male screw thread for trim attachment.

8. A low voltage lighting fixture according to claim 1 in which the lamp is an incandescent filament lamp having a dichroic reflector which permits transmission of infrared energy to the distal end of the lamp housing.

9. A low voltage lighting fixture according to claim 2 in which the lamp is an incandescent filament lamp and the concave reflector is an optically diffusing reflector.

10. A low voltage lighting fixture according to claim 1 or 2 in which the lamp socket is a bayonet base socket formed integrally with the lamp housing.

* * * * *